United States Patent
Cazier et al.

(10) Patent No.: US 7,454,085 B2
(45) Date of Patent: Nov. 18, 2008

(54) METHOD AND APPARATUS FOR THE CREATION OF TEXTURES AND BORDERS FOR DIGITAL IMAGES

(75) Inventors: Robert P. Cazier, Fort Collins, CO (US); Murray D. Craig, Johnstown, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 11/119,280

(22) Filed: Apr. 29, 2005

(65) Prior Publication Data

US 2006/0245670 A1    Nov. 2, 2006

(51) Int. Cl.
*G06K 9/20* (2006.01)
*G06K 9/36* (2006.01)

(52) U.S. Cl. ..................... 382/282; 382/284
(58) Field of Classification Search ........... 382/282, 382/283, 284, 294, 276, 173; 345/629; 358/537, 358/538, 453, 464
See application file for complete search history.

(56) References Cited

U.S. PATENT DOCUMENTS

| | | | |
|---|---|---|---|
| 5,815,645 A | 9/1998 | Fredlund | |
| 5,880,740 A * | 3/1999 | Halliday et al. | 345/629 |
| 6,011,536 A | 1/2000 | Hertzmann | |
| 6,101,293 A | 8/2000 | McKenzie | |
| 6,154,577 A | 11/2000 | Warnick | |
| 6,285,468 B1 | 9/2001 | Cok | |
| 6,317,192 B1 | 11/2001 | Silverbrook | |
| 6,431,448 B1 * | 8/2002 | Nelson et al. | 235/462.13 |
| 6,671,387 B1 | 12/2003 | Chen | |
| 6,724,913 B1 | 4/2004 | Chen | |
| 6,775,407 B1 | 8/2004 | Gindele | |
| 6,795,585 B1 | 9/2004 | Parada | |
| 6,950,198 B1 * | 9/2005 | Berarducci et al. | 358/1.12 |
| 2003/0139840 A1 * | 7/2003 | Magee et al. | 700/133 |
| 2004/0258308 A1 | 12/2004 | Sadovsky | |
| 2004/0263640 A1 | 12/2004 | Silverbrook | |

* cited by examiner

*Primary Examiner*—Yon Couso

(57) ABSTRACT

First and second digital images are provided. A user is given the choice of using the first image as a texture or a border for the second digital image. A portion of the first image may be selected for use as the texture or border. As necessary, the first and second images may be resized. The two images are overlayed (with appropriate amounts of transparency for the generation of textures). If necessary, the first image may be tiled to completely cover the second image (for a texture), or to surround the second image (for a border).

18 Claims, 6 Drawing Sheets

METHOD AND APPARATUS FOR THE CREATION OF TEXTURES AND BORDERS FOR DIGITAL IMAGES

FIELD OF THE INVENTION

The present invention relates generally to the field of image capture, and more particularly to the field of accurate and easy texture and border creation for digital images.

BACKGROUND OF THE INVENTION

In the field of digital imaging, many photographers, both beginning and advanced, have a desire to make their images more personal. One method of doing this involves the use of image post-processing methods to add effects such as borders and textures to their images. Currently, the application of complex and powerful digital image effects requires the user to transfer raw images to a computer where (often expensive) software is used to apply the effects to their images. For users desiring to either directly couple their digital camera (or other image capture device) to a printer, there currently are only a very limited number of image effects available on camera, or within the printer firmware.

SUMMARY OF THE INVENTION

First and second digital images are provided. A user is given the choice of using the first image as a texture or a border for the second digital image. A portion of the first image may be selected for use as the texture or border. As necessary, the first and second images may be resized. The two images are overlayed (with appropriate amounts of transparency for the generation of textures). If necessary, the first image may be tiled to completely cover the second image (for a texture), or to surround the second image (for a border).

Other aspects and advantages of the present invention will become apparent from the following detailed description, taken in conjunction with the accompanying drawings, illustrating by way of example the principles of the invention.

DETAILED DESCRIPTION

Figure 1:
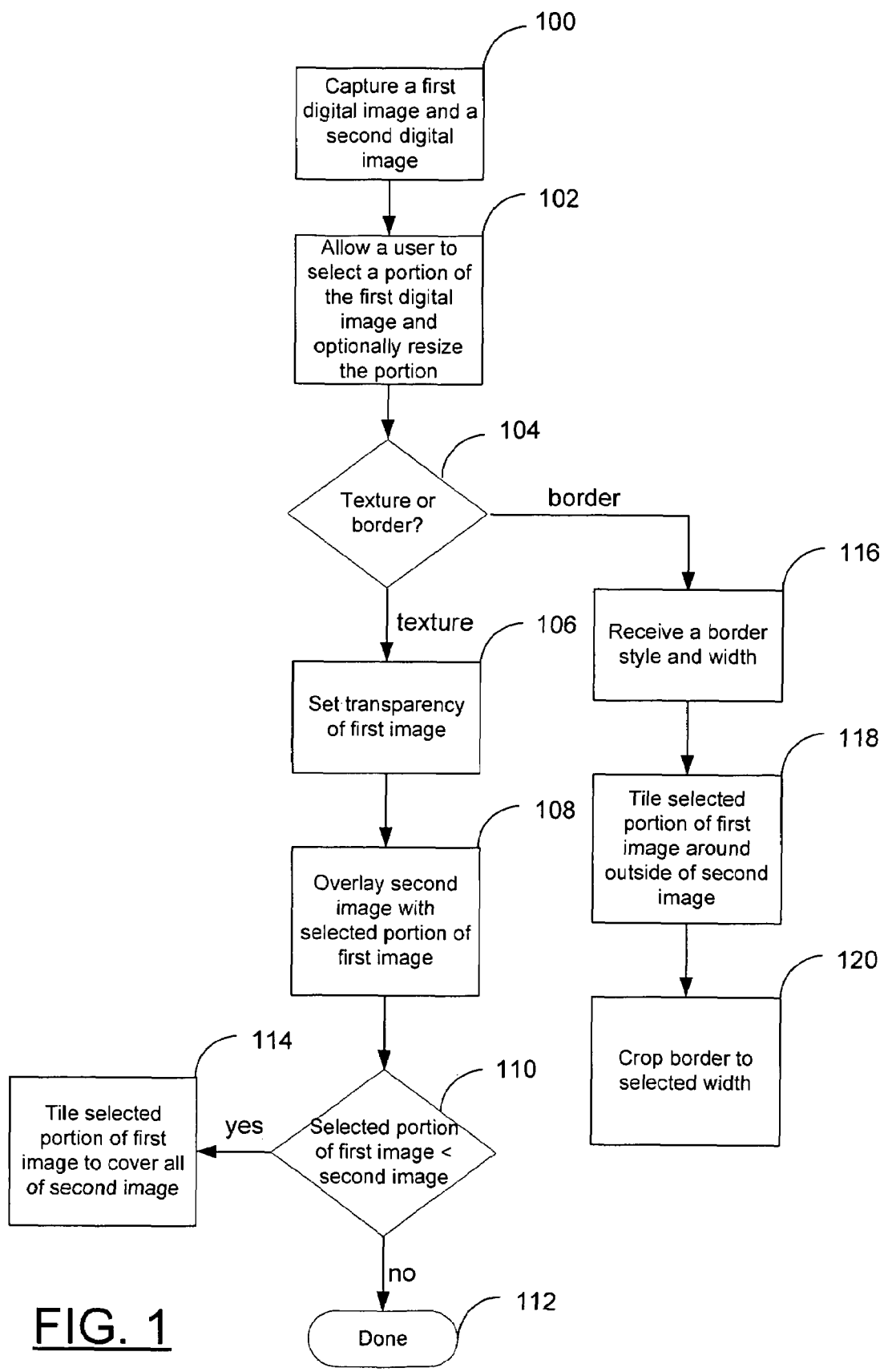
FIG. 1 is a flowchart of an example embodiment of a method for the creation of textures and borders for digital images according the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1 is a flowchart of an example embodiment of a method for the creation of textures and borders for digital images according the present invention. In a step 100, an image capture device is used to capture a first digital image and a second digital image. In this example embodiment of the present invention, the first digital image, or a portion thereof, will be used as a texture or border for the second digital image. In a step 102, the image capture device prompts a user to select a portion of the first digital image for use as the texture or border. The selected portion may, if the user so desires, include the entirety of the first digital image. Also, the user may resize the first digital image as desired for use as the texture or border. In a decision step 104, the user is prompted to select whether to use the portion of the first digital image as a texture or as a border. If the user selects to use the first digital image as a texture control is passed to step 106, where the desired transparency of the portion of the first digital image is set. Some embodiments of the present invention may allow a user to select the amount of transparency to use, while other embodiments may automatically set a transparency of the portion of the first digital image. In a step 108, the second digital image is overlayed with the now somewhat transparent portion of the first digital image. In a decision step 110, the size of the portion of the first digital image is compared to the size of the second digital image. If the portion of the first digital image completely covers the second digital image, control is passed to a step 112, where the process terminates. Some example embodiments of the present invention may require that the sizes of the two images are equal in order to generate a full frame texture or border without tiling. Still other example embodiments of the present invention may increase or decrease the size of one of the images to match the size of the other image. If the portion of the first digital image is smaller than the second digital image in either the x dimension or the y dimension (or both), control is passed to a step 114, where the portion of the first digital image is tiled over the second digital image to cover the entire second digital image. Those of skill in the art will recognize that standard tiling routines may be used within the scope of the present invention to ensure that the second digital image is completely covered by representations of the portion of the first digital image or, as described above, to ensure that the sizes of the two images match.

In a decision step 104, if the user selected to use the portion of the first digital image as a border, control is passed to a step 116, where a border style and width is set. In some embodiments of the present invention, the width of the border may be set to a default value, while other embodiments of the present invention may allow a user to set a border width. Likewise, in some embodiments of the present invention, the user may be presented with a variety of border styles to choose from. For example, border styles such as circular, oval, square, rectangular, rectangular with rounded corners, hexagonal, octagonal, and many others may be available for a user to choose from. Those of skill in the art will recognize that a very large variety of border styles may be used within the scope of the present invention, and the above list is just a small sample of possible border styles. In a step 118, the selected portion of the first digital image is tiled around the outside of the second digital image. As discussed above relating to textures, some example embodiments of the present invention may require that the sizes of the two images are equal in order to generate a full frame texture or border without any tiling. Still other example embodiments of the present invention may increase or decrease the size of one of the images to match the size of the other image plus the width of the desired border. In such an example embodiment of the present invention, the second digital image is smaller than the selected portion of the first digital image. The first digital image is cropped, or enlarged or shrunk, to the size of the second digital image plus the desired border width on each side. The second digital image is then placed in the center of the first digital image, overlaying the first digital image such that the resulting image has the outside parts of the first digital image acting as a border for the second digital image. Those of skill in the art will recognize that any standard method of tiling the portion of the first digital image may be used within the scope of the present invention to ensure that the second digital image is completely surrounded by representations of the first digital image. In a step 120, the border is cropped to the selected width. Those of skill in the art will recognize that in some embodiments of the present invention, the cropping step may occur before the tiling step. For example, the selected portion of the first digital image may be cropped to the width of the border before tiling, while other embodiments may tile before cropping.

Figure 2A:
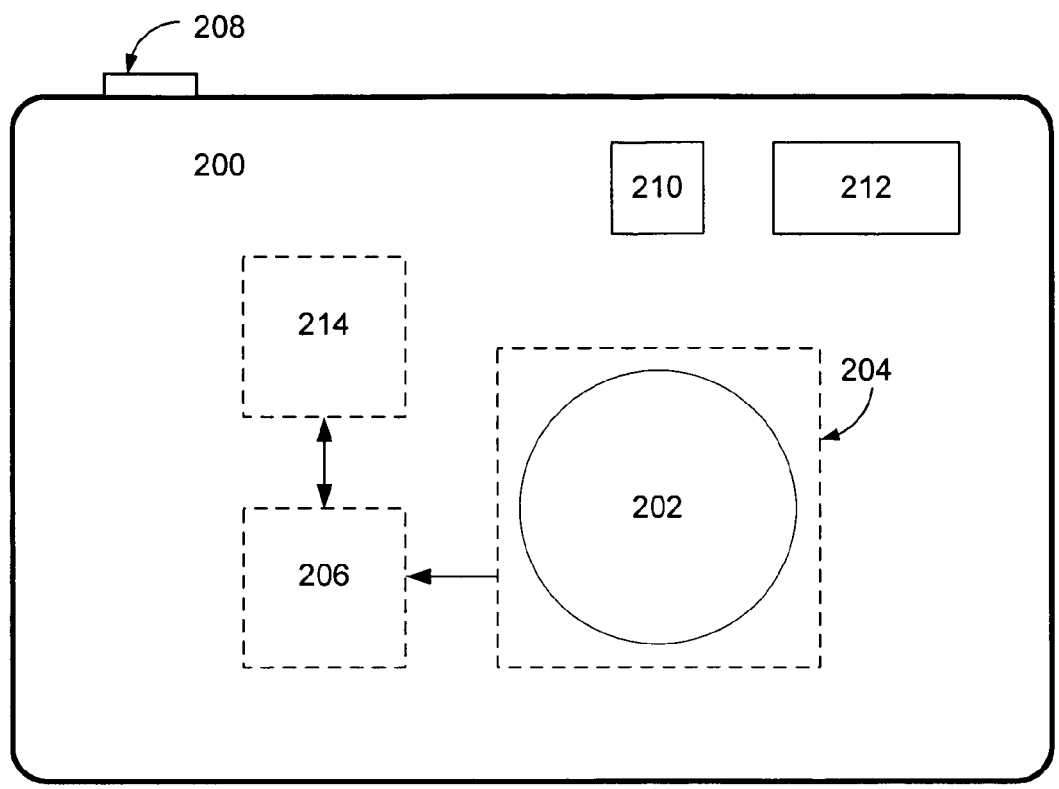
FIG. 2A is a front view of an example embodiment of an image capture device according to the present invention.

FIG. 2A is a front view of an example embodiment of an image capture device according to the present invention. In this example embodiment of the present invention, a digital camera is designed including a body 200, a lens 202, an image sensor 204 configure to sense an image projected onto it by the lens 202, a memory 206, electrically coupled with the image sensor 204 configure to store image data. The digital camera also includes a processor 214 configured to allow a user to select a portion of a first digital image, and apply border or texture effects to a second digital image, and save the modified second digital image in the memory 206. This example digital camera also includes a shutter button 208, a viewfinder 210, and a flash 212.

Figure 2B:
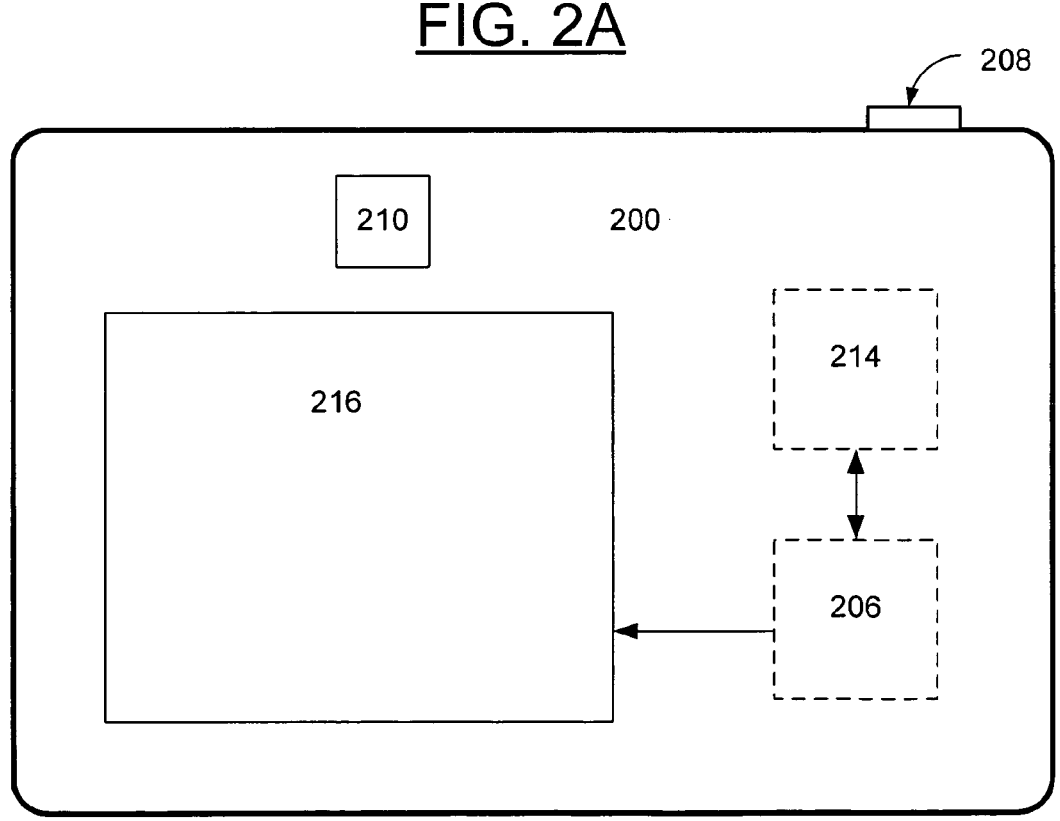
FIG. 2B is a rear view of an example embodiment of the image capture device according to the present invention from FIG. 2A.

FIG. 2B is a rear view of an example embodiment of the image capture device according to the present invention from FIG. 2A. This example digital camera also includes a display 216 (such as an LCD) electrically coupled to the memory 206 configured to display captured images and menus allowing a user to select between applying the first digital image as a border or texture, to select a border style and width, to select a portion (or the entirety) of the first digital image for use as a border or texture, and possibly allowing the user to set a transparency of the first digital image when applying a texture.

Figure 3:
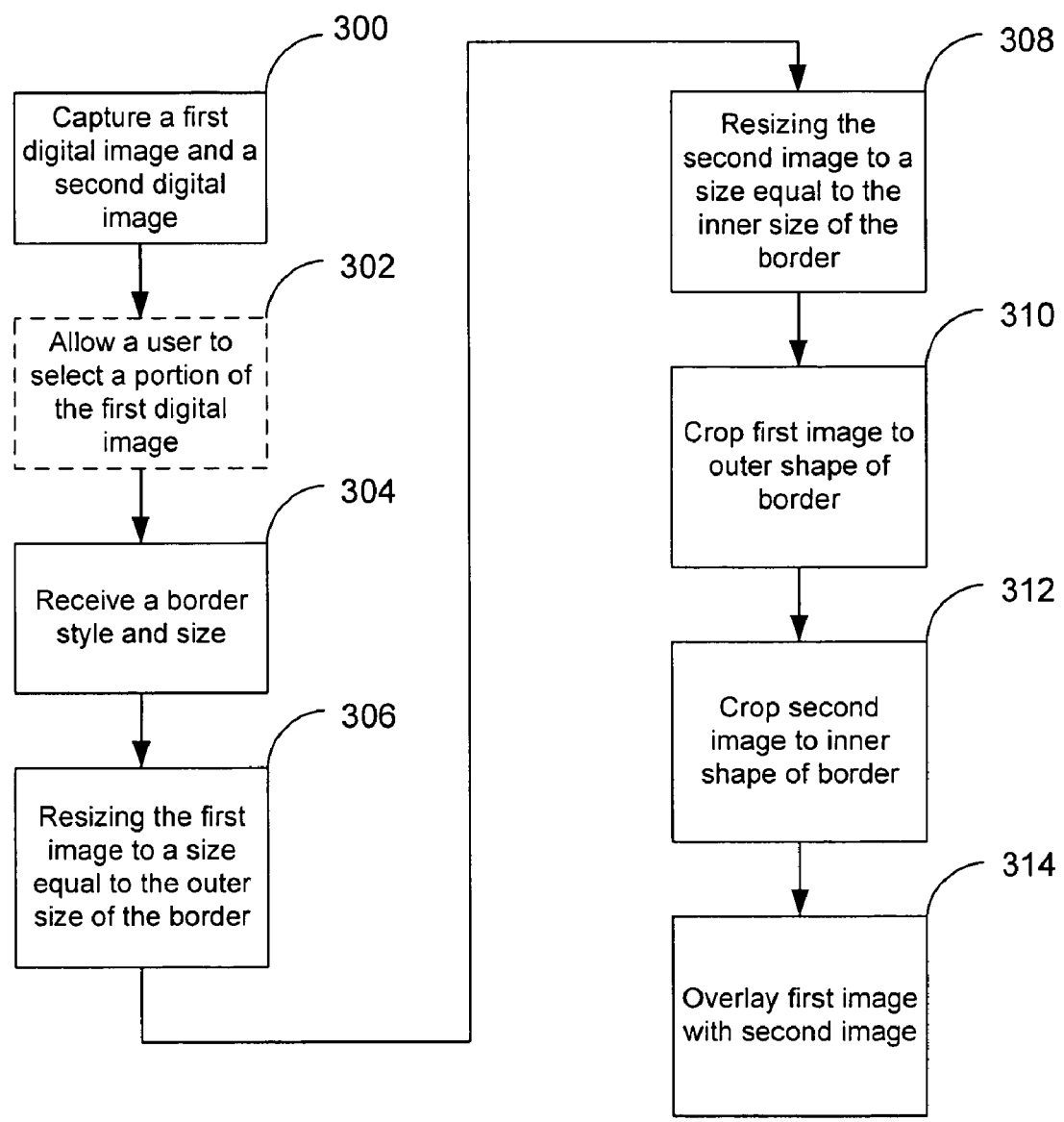
FIG. 3 is a flowchart of an example embodiment of a method for the creation of borders for digital images according the present invention.

FIG. 3 is a flowchart of an example embodiment of a method for the creation of borders for digital images according the present invention. In this example embodiment of the present invention, a border is created without tiling the first digital image. In a step 300, a first digital image and a second digital image are captured. In an optional step 302, the user is allowed to select a portion of the first digital image for use as a border. In some example embodiments of the present invention, step 302, may be skipped, and the entire first digital image used to create the border. In a step 304, a border style and a border size are received, possibly by user selection. The border size includes an inner size and an outer size. The border style includes an outer shape and an inner shape. Those of skill in the art will recognize that there is no requirement for the inner shape of the border to match the outer shape of the border. In a step 306, the first digital image is reduced or enlarged to a size equal to the outer size of the border. In a step 308, the second image is reduced or enlarged to a size equal to the inner size of the border. In a step 310, the first digital image is cropped to the outer shape of the border. In a step 312, the second digital image is cropped to the inner shape of the border. In a step 314, the first digital image is overlayed with the second digital image such that the outer portions of the first digital image form a border around the second digital image. Those of skill in the art will recognize that there is no requirement for the second digital image to be centered within the first digital image within the scope of the present invention.

Figure 4A:
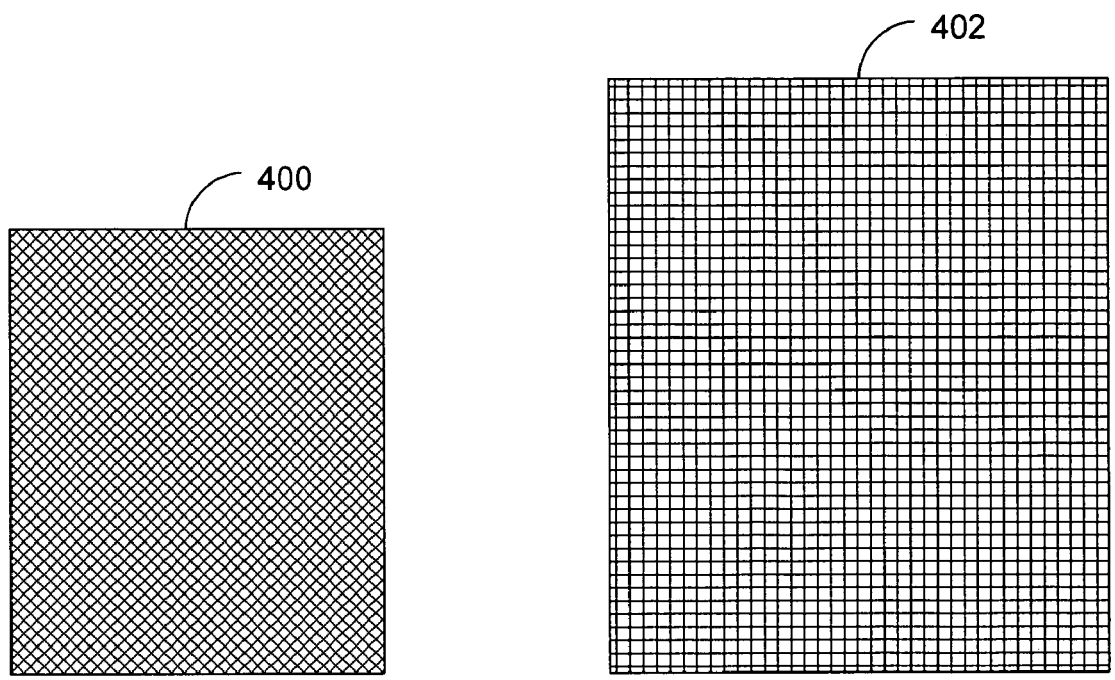
FIG. 4A is a drawing of a first digital image and second digital image according to an example embodiment of the present invention.

FIG. 4A is a drawing of a first digital image and second digital image according to an example embodiment of the present invention. In this example embodiment of the present invention, a first digital image 400 and a second digital image 402 have been captured.

Figure 4B:
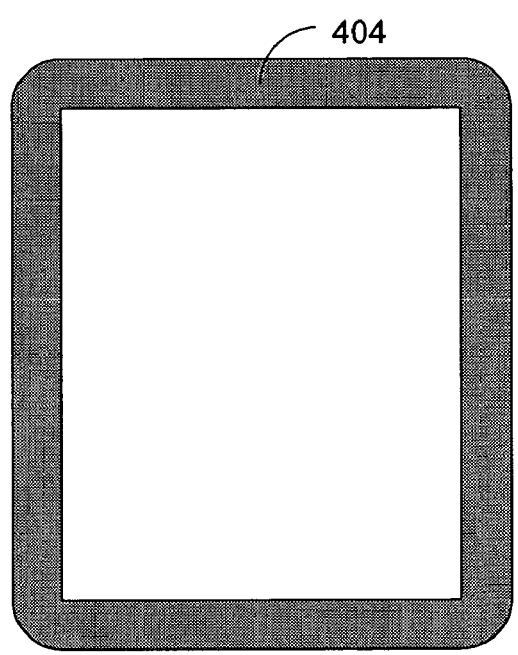
FIG. 4B is a drawing of a border style and size according to an example embodiment of the present invention.

FIG. 4B is a drawing of a border style and size according to an example embodiment of the present invention. A border 404 has been selected having a style and a size. The border 404 includes an outer size, an inner size, an outer shape, and an inner shape. Note that in this example embodiment of the present invention the inner shape and outer shape are different.

Figure 4C:
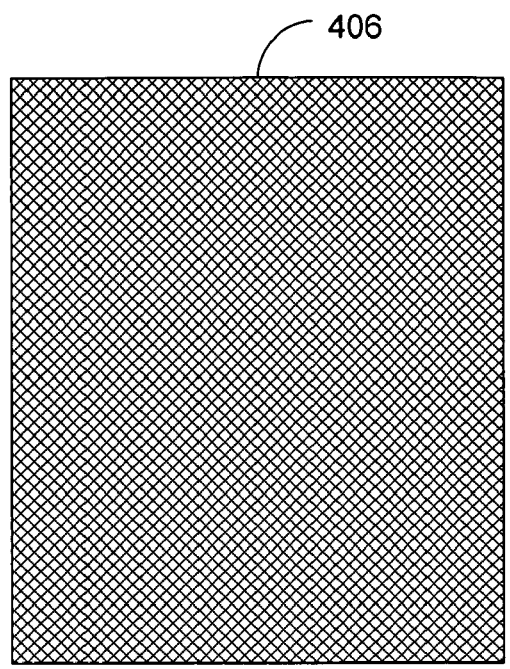
FIG. 4C is a drawing of the first digital image from FIG. 4A enlarged to a size of the outside of the border from FIG. 4B according to an example embodiment of the present invention.

FIG. 4C is a drawing of the first digital image from FIG. 4A enlarged to a size of the outside of the border from FIG. 4B according to an example embodiment of the present invention. The first digital image 406 has now been enlarged to match the outer size of the border 404.

Figure 4D:
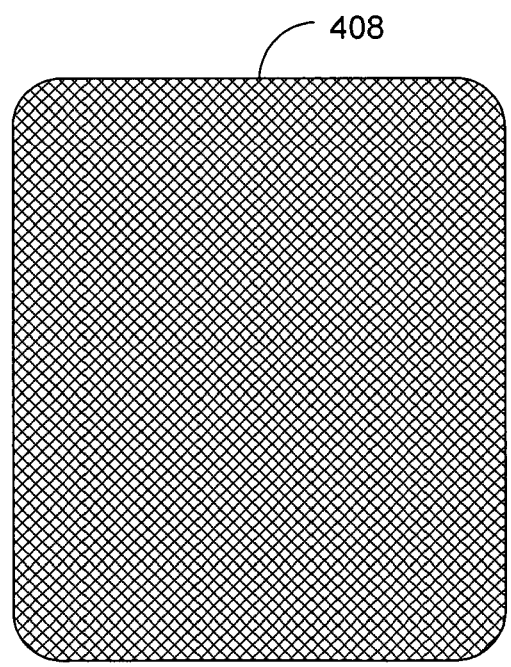
FIG. 4D is a drawing of the first digital image from FIG. 4C cropped to the shape of the outside of the border from FIG. 4B according to an example embodiment of the present invention.

FIG. 4D is a drawing of the first digital image from FIG. 4C cropped to the shape of the outside of the border from FIG. 4B according to an example embodiment of the present invention. The first digital image 408 has now been cropped to match the outer shape of the border 404.

Figure 4E:
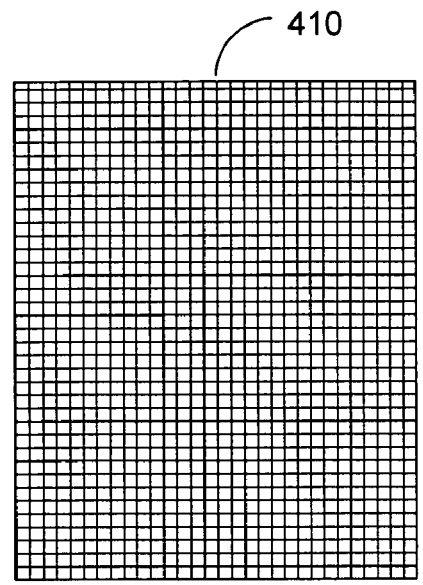
FIG. 4E is a drawing of the second digital image from FIG. 4A reduced to a size of the inside of the border from FIG. 4B according to an example embodiment of the present invention.

FIG. 4E is a drawing of the second digital image from FIG. 4A reduced to a size of the inside of the border from FIG. 4B according to an example embodiment of the present invention. The second digital image 410 has now been reduced to match the inner size of the border 404. Not that in this example embodiment of the present invention the shape out the second digital image 402 already matches the inner shape of the border 404 so no cropping of the second digital image 402 is required.

Figure 4F:
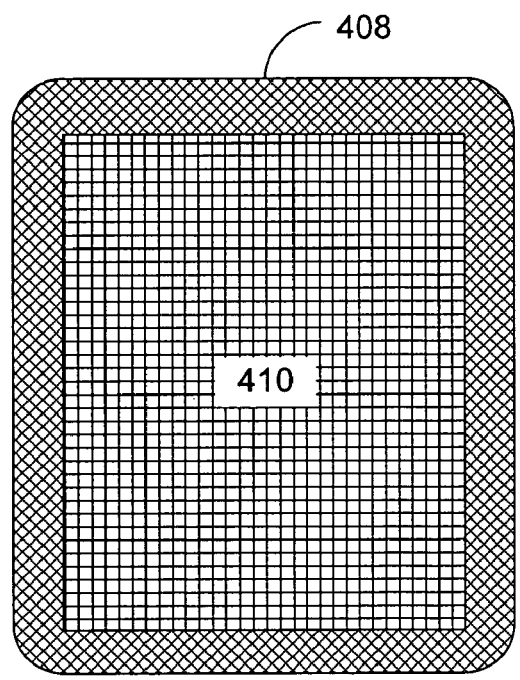
FIG. 4F is a drawing of the first digital image from FIG. 4D, overlayed by the second digital image from FIG. 4E according to an example embodiment of the present invention.

FIG. 4F is a drawing of the first digital image from FIG. 4D, overlayed by the second digital image from FIG. 4E according to an example embodiment of the present invention. In this example embodiment of the present invention the second digital image 410 has been centered within the first digital image 408 such that the outer portion of the first digital image 408 created the desired border around the second digital image 410. Those of skill in the art will recognize that while in this example embodiment the second digital image 410 is not transparent, other example embodiments of the present invention may adjust the transparency of the second digital image 410 such that the first digital image 408 acts as a texture to the second digital image 410 as well as a border.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising the steps of:
    capturing a first digital image;
    capturing a second digital image
    allowing a user to select a portion of the first digital image
    prompting a user to select between using the portion of the first digital image as a texture or a border of the second digital image;
    applying the portion of the first digital image as a texture over the second digital image when the user selects use as a texture; and
    applying the portion of the first digital image as a border around the second digital image when the user selects use as a border.

2. A method as recited in claim 1,
    wherein said step of applying the portion of the first digital image as a texture includes the sub-steps of:
        i) setting a transparency of the portion of the first digital image;
        ii) overlaying the second digital image with the first digital image;
        iii) comparing the height and width of the portion of the first digital image to the height and width of the second digital image; and
        iv) tiling the portion of the first digital image over the second digital image when the height or width of the portion of the first digital image is smaller than the height or width of the second digital image.

3. A method as recited in claim 2,
    wherein a user is prompted to set the transparency of the portion of the first digital image.

4. A method as recited in claim 1,
    wherein said step of applying the portion of the first digital image as a border includes the sub-steps of:
        i) setting a border width;
        ii) tiling the portion of the first digital image around the outside of the second digital image; and
        iii) cropping the tiled portions of the first digital image to the border width.

5. A method as recited in claim 4,
    wherein a user is prompted to set the border width.

6. A method as recited in claim 1,
    wherein said step of allowing a user to select a portion of a first digital image allows the user to select the entire first digital image.

7. A method as recited in claim 1,
    wherein said step of allowing a user to select a portion of a first digital image allows the user to resize the portion of the first digital image.

8. A method as recited in claim 1,
    wherein said step of applying the portion of the first digital image as a border includes the sub-steps of:
        i) setting a border style and size, wherein the border includes an outer size, an inner size, an outer shape, and an inner shape;
        ii) resizing the first digital image to a size equal to the outer size of the border;
        iii) resizing the second digital image to a size equal to the inner size of the border;
        iv) cropping the first digital image to the outer shape of the border;
        v) cropping the second digital image to the inner shape of the border; and
        vi) overlaying the first digital image with the second digital image such that the first digital image forms a border around the second digital image.

9. A method as recited in claim 8,
    wherein said step of applying the portion of the first digital image as a border includes the sub-step of:
        i) setting a transparency of the second digital image.

10. An image capture device comprising:
    a memory configured to store digital images, containing a first digital image and a second digital image; and
    a processor electrically coupled with said memory, configured to:
        allow a user to select a portion of the first digital image,
        prompt a user to select between using the portion of the first digital image as a texture or a border of the second digital image;
        apply the portion of the first digital image as a texture over the second digital image when the user selects use as a texture; and
        apply the portion of the first digital image as a border around the second digital image when the user selects use as a border.

11. An image capture device as recited in claim 10,
    wherein said processor is also configured to:
        set a transparency of the portion of the first digital image;
        overlay the second digital image with the first digital image;
        compare the height and width of the portion of the first digital image to the height and width of the second digital image; and
        tile the portion of the first digital image over the second digital image when the height or width of the portion of the first digital image is smaller than the height or width of the second digital image.

12. An image capture device as recited in claim 11,
    wherein said processor is also configured to prompt a user to set the transparency of the portion of the first digital image.

13. An image capture device as recited in claim 10,
    wherein said processor is also configured to:
        set a border width;
        tile the portion of the first digital image around the outside of the second digital image; and
        crop the tiled portions of the first digital image to the border width.

14. An image capture device as recited in claim 13,
    wherein said processor is also configured to prompt a user to set the border width.

15. An image capture device as recited in claim 10, wherein said processor is also configured to allow a user to select the entire first digital image as a portion of the first digital image.

16. An image capture device as recited in claim 10, wherein said processor is also configured to allow a user to resize the selected portion of the first digital image.

17. An image capture device as recited in claim 10, wherein said processor is also configured to:
   set a border style and size, wherein the border includes an outer size, an inner size, an outer shape, and an inner shape;
   resize the first digital image to a size equal to the outer size of the border;
   resize the second digital image to a size equal to the inner size of the border;
   crop the first digital image to the outer shape of the border;
   crop the second digital image to the inner shape of the border; and
   overlay the first digital image with the second digital image such that the first digital image forms a border around the second digital image.

18. An image capture device as recited in claim 17, wherein said processor is also configured to set a transparency of the second digital image.

* * * * *

UNITED STATES PATENT AND TRADEMARK OFFICE
CERTIFICATE OF CORRECTION

PATENT NO.         : 7,454,085 B2                                              Page 1 of 1
APPLICATION NO.    : 11/119280
DATED              : November 18, 2008
INVENTOR(S)        : Robert P. Cazier et al.

It is certified that error appears in the above-identified patent and that said Letters Patent is hereby corrected as shown below:

In column 5, line 25, in Claim 1, after "image" insert -- ; --.

In column 5, line 26, in Claim 1, after "image" insert -- ; --.

Signed and Sealed this

Fifth Day of May, 2009

JOHN DOLL
*Acting Director of the United States Patent and Trademark Office*